United States Patent
Brown et al.

(10) Patent No.: US 7,707,639 B2
(45) Date of Patent: Apr. 27, 2010

(54) SYSTEM AND METHOD FOR HANDLING RESTORATION OPERATIONS ON MOBILE DEVICES

(75) Inventors: Michael K. Brown, Kitchener (CA); Neil P. Adams, Waterloo (CA); Michael S. Brown, Waterloo (CA); Jonathan F. Hammell, Dobbinton (CA); Michael G. Kirkup, Waterloo (CA); Herbert A. Little, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1032 days.

(21) Appl. No.: 11/065,984

(22) Filed: Feb. 25, 2005

(65) Prior Publication Data
US 2006/0021059 A1    Jan. 26, 2006

Related U.S. Application Data

(60) Provisional application No. 60/567,164, filed on Apr. 30, 2004.

(51) Int. Cl.
*G06F 11/14* (2006.01)
(52) U.S. Cl. ............... 726/26; 726/30; 726/23; 726/24; 726/20; 726/14; 726/22; 713/188; 713/201

(58) Field of Classification Search ............ 455/404.1, 455/456.1, 419, 418; 713/200, 201; 726/22–24, 726/26
See application file for complete search history.

(56) References Cited

U.S. PATENT DOCUMENTS

| 6,757,713 | B1* | 6/2004 | Ogilvie et al. | 709/206 |
| 6,813,487 | B1* | 11/2004 | Trommelen | 455/404.1 |
| 7,114,184 | B2* | 9/2006 | Malivanchuk et al. | 726/24 |
| 2004/0158741 | A1* | 8/2004 | Schneider | 713/201 |
| 2005/0064859 | A1* | 3/2005 | Kotzin et al. | 455/419 |

FOREIGN PATENT DOCUMENTS

| WO | WO 03/079196 A2 | 9/2003 |
| WO | WO 2004/008781 A2 | 1/2004 |
| WO | WO 2004/057834 A2 | 7/2004 |

OTHER PUBLICATIONS

International Search Report of Application No. PCT/CA2005/000275, date of mailing Jun. 13, 2005—13 pgs.

* cited by examiner

*Primary Examiner*—Charles N Appiah
*Assistant Examiner*—Randy Peaches
(74) *Attorney, Agent, or Firm*—Jones Day; Krishna K. Pathiyal; Robert C. Liang (57) ABSTRACT

Systems and methods for handling restoration operations for a mobile device. A mobile device receives a kill pill command, wherein the command causes some or all data on the mobile device to be wiped. An indicator is stored to indicate that the kill pill command was sent to the mobile device. The indicator is used to determine whether a program should be wiped from the mobile device.

30 Claims, 8 Drawing Sheets

SYSTEM AND METHOD FOR HANDLING RESTORATION OPERATIONS ON MOBILE DEVICES

CROSS-REFERENCE TO RELATED APPLICATION

This application claims priority to and the benefit of U.S. Provisional Application Ser. No. 60/567,164 filed on Apr. 30, 2004, of which the entire disclosure (including any and all figures) of the application is incorporated herein by reference.

BACKGROUND

1. Technical Field

The present invention relates generally to the field of communications, and in particular to handling restoration operations on mobile wireless communications devices.

2. Description of the Related Art

Systems that handle mobile devices can be configured to support the idea of a "kill pill." This feature provides the functionality that if a handheld mobile device is lost or stolen, the owner could call their information technology (IT) department to let them know. The IT department may send a kill packet to the device which would cause all of the data to be wiped, in order to prevent its disclosure.

Difficulties arise with this feature. For example, a problem is that the thief could load Trojan software onto the device, and leave it for the owner to find. Then the owner would find it, reload their data, and not even know about the Trojan software.

SUMMARY

In accordance with the teachings disclosed herein, systems and methods are disclosed for handling restoration operations for a mobile device.

As an example of a system and method, a mobile device receives a kill pill command, wherein the command causes data on the mobile device to be wiped. An indicator is stored to indicate that the kill pill command was sent to the mobile device. The indicator is used to determine whether a program should be wiped from the mobile device.

As another example of a system and method, if a kill pill is sent to a mobile device, then an indicator indicating that this has happened is stored in the device's nonvolatile store. If the device is found, then the indicator is checked. If it has been set, a series of operations is performed. In one such operation, one or more applications are wiped from the device.

As yet another example of a system and method, an IT (information technology administrator (or an agent thereof) sends a kill pill command to a mobile device. An indicator indicating that this has happened is stored in the device's nonvolatile store. If the device is found, then the indicator is checked. If it has been set, a series of operations is performed. In one such operation, one or more applications are wiped from the device according to a program wipe configuration provided by the IT administrator.

Another system and method include first instructions that are configured to execute upon a mobile device and configured to store an indicator on the mobile device that the kill pill command was sent to the mobile device. The mobile device wipes data on the mobile device in response to the kill pill command. Second instructions are configured to execute on the mobile device, and after the mobile device is recovered, the second instructions are configured to use the indicator to determine whether a program should be wiped from the mobile device.

Another system and method include server-side instructions and steps that provide program wipe configurations to mobile devices in order to determine what programs are to be wiped from a mobile device.

As will be appreciated, the systems and methods disclosed herein are capable of modifications in various respects. Accordingly, the drawings and description set forth herein are to be regarded as illustrative in nature and not restrictive.

DETAILED DESCRIPTION OF THE DRAWINGS

Figure 1:
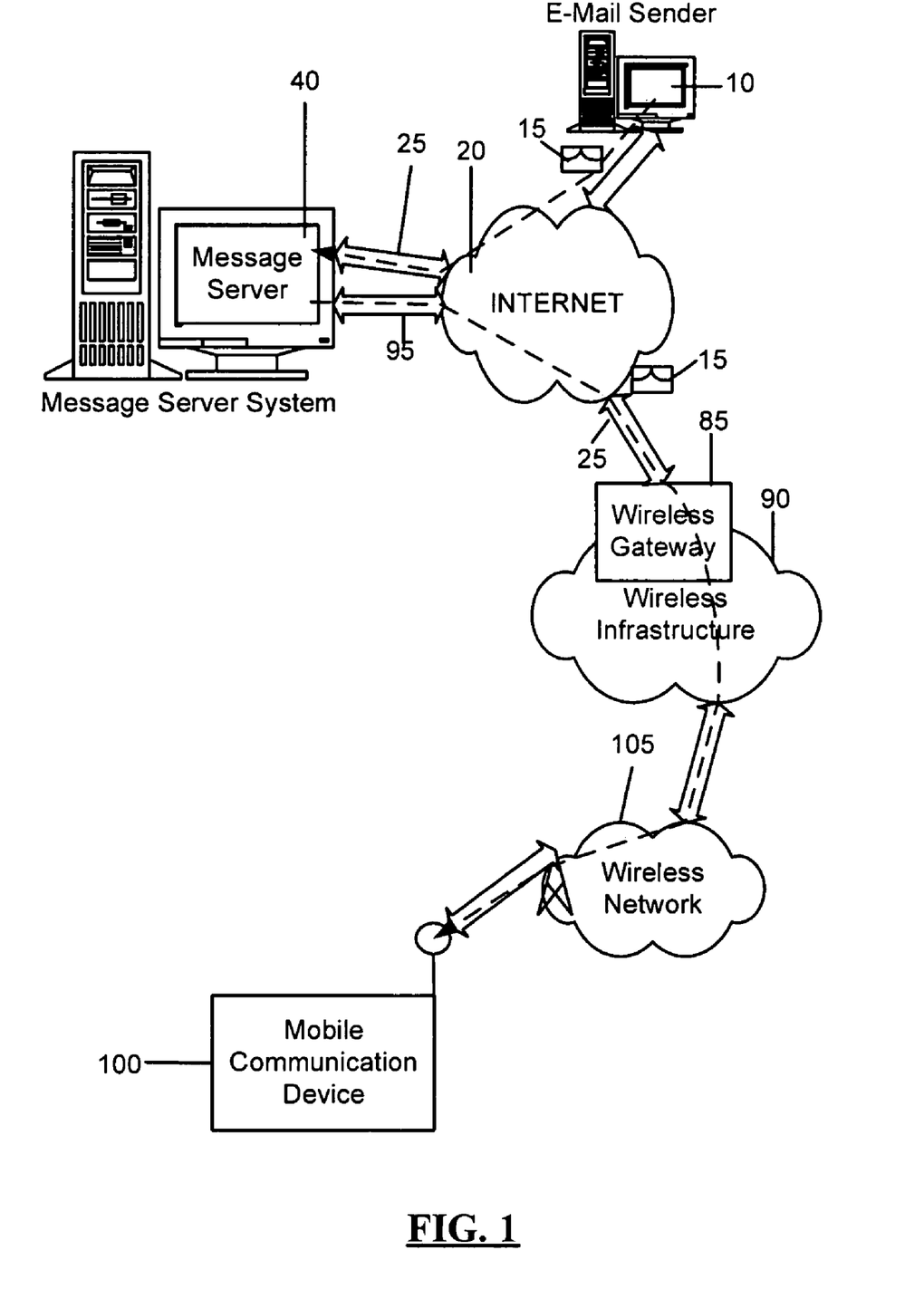
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have pre-defined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
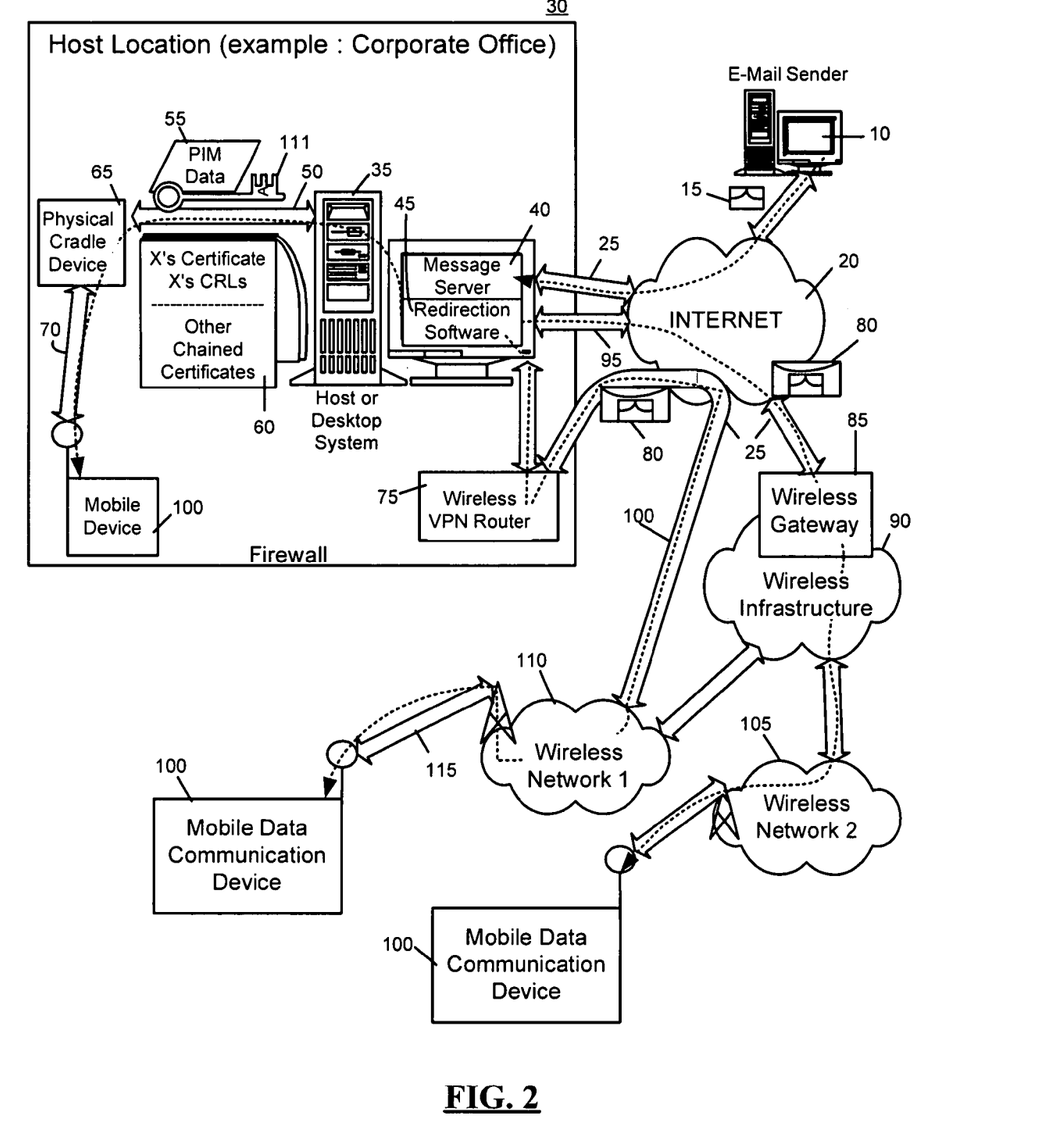
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
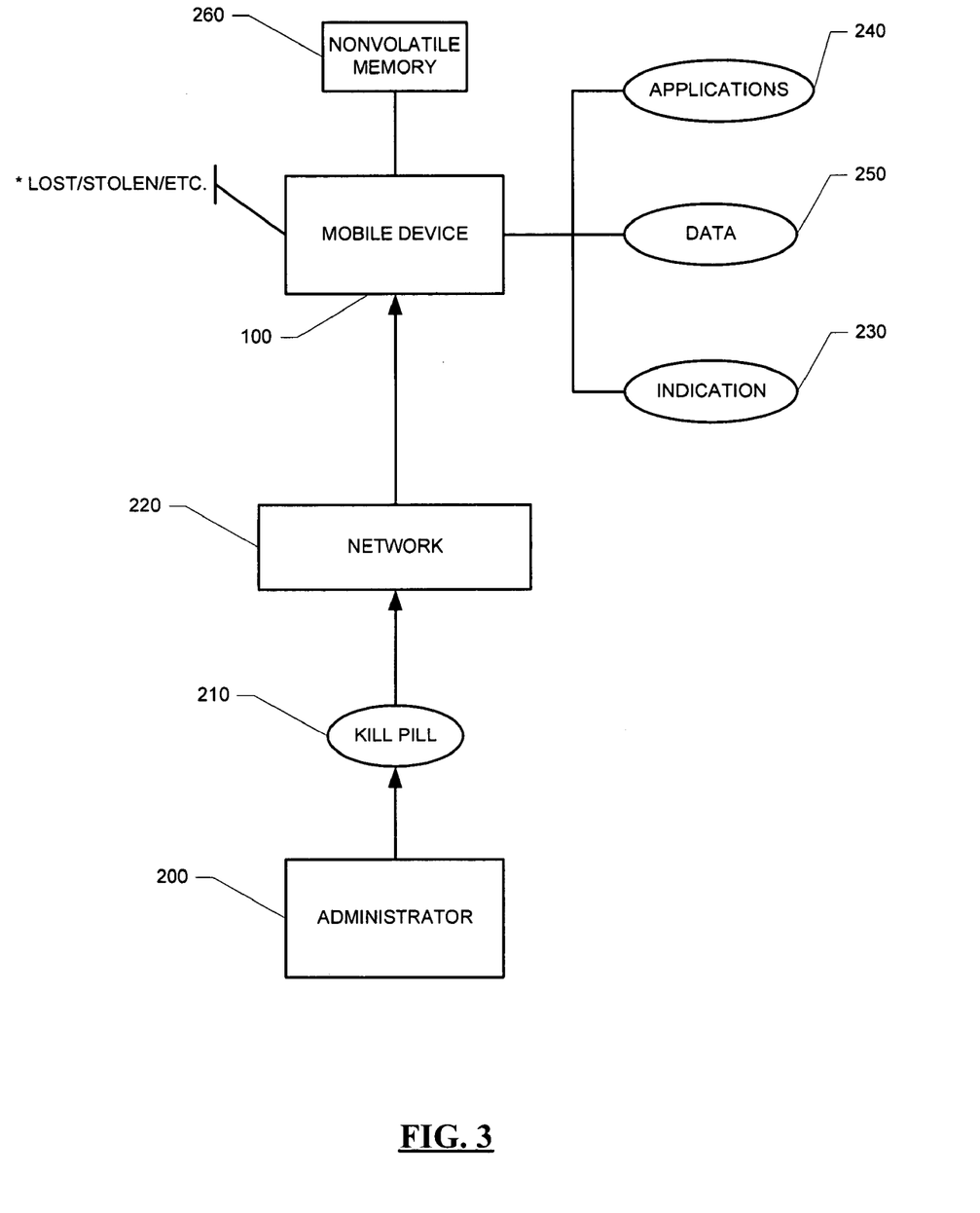
FIGS. 3 and 4 are block diagrams depicting the handling of a mobile device that has become lost or stolen.

FIG. 3 depicts a system for handling a mobile device 100 and that has been lost, stolen or otherwise has become missing. If a handheld mobile device 100 is in such a state, the IT administrator or department 200 sends a kill pill packet 210 to the device 100 which would cause all of the data 250 to be wiped, in order to prevent its disclosure.

When a kill pill packet 210 is sent to the device 100, then an indication 230 is used to indicate that a kill pill situation has occurred. The indication 230 is stored in a non-volatile store 260 of the device 100. Because the indication 230 is stored in a non-volatile store 260, the indication 230 is not erased during the wipe.

Figure 4:
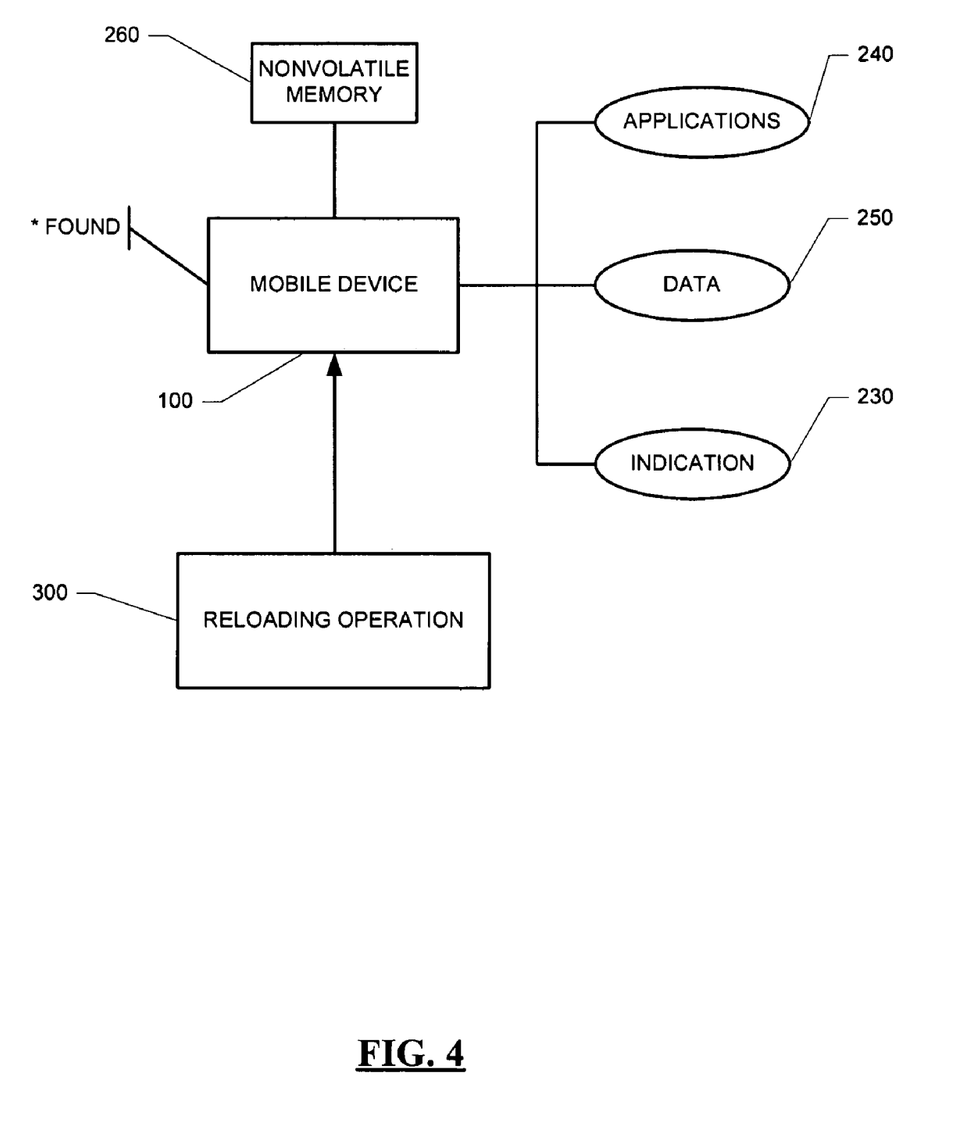

With reference to FIG. 4, if the device 100 is later found, and the user recradles it (or begins an over-the-air synchronization) to reload their device data, then the indication 230 is checked. If the indication 230 is present in the non-volatile store 260, then all of the applications or certain applications 240 are wiped from the device 100. In this way, any Trojan software is also deleted.

The device 100 can be configured to indicate which applications 240 are to be erased during a reloading operation 300 that occurs after a kill pill situation. For example, the configuration can specify that any applications not provided by the manufacturer of the device 100 can be wiped, while those applications provided by the manufacturer of the device 100 can remain on the device 100. Still further, the device 100 can be configured via a list that designates specific applications 240 that are to be wiped during the reloading operation 300 as well as specific applications 240 that are to remain on the device 100.

Figure 5:
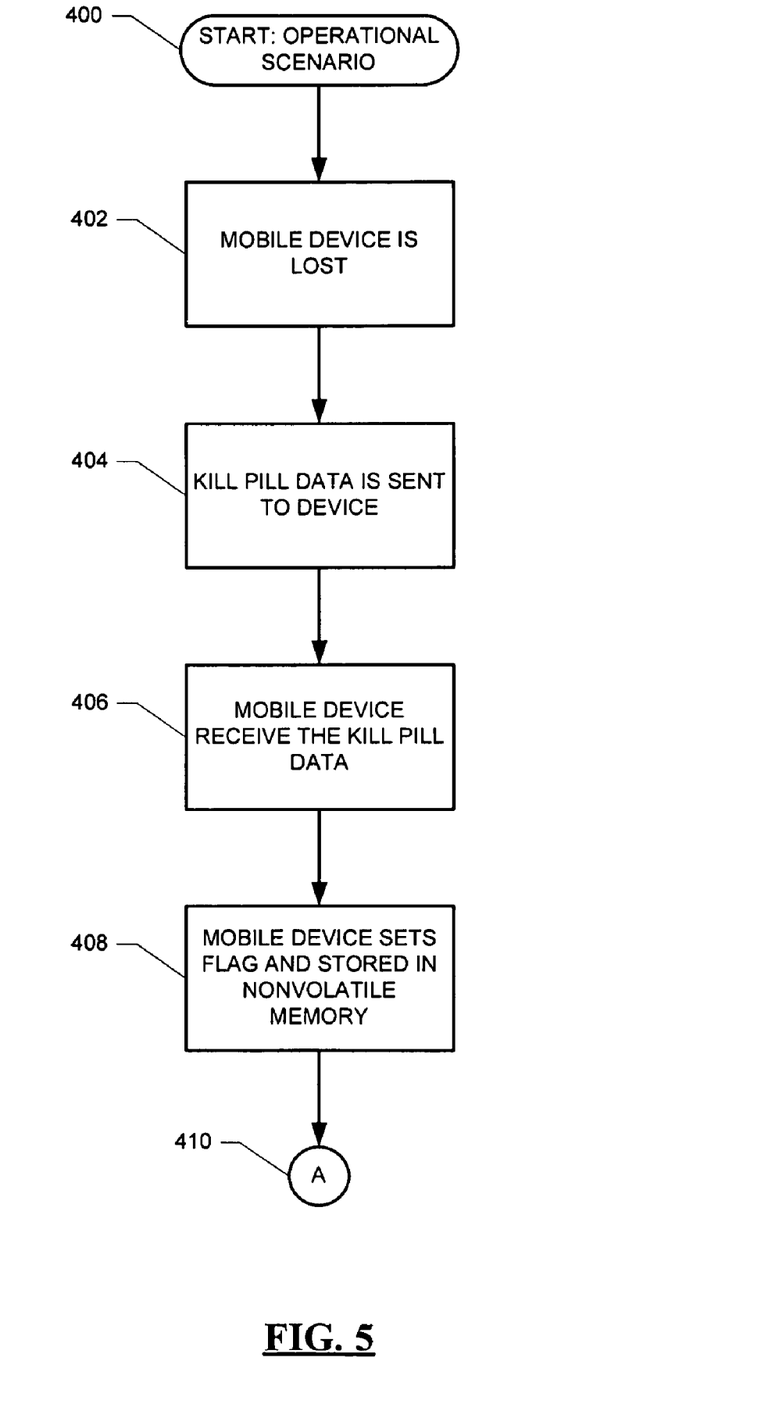
FIGS. 5 and 6 are flowcharts depicting restoration of data and applications for a mobile device that has become lost or stolen.
Figure 6:
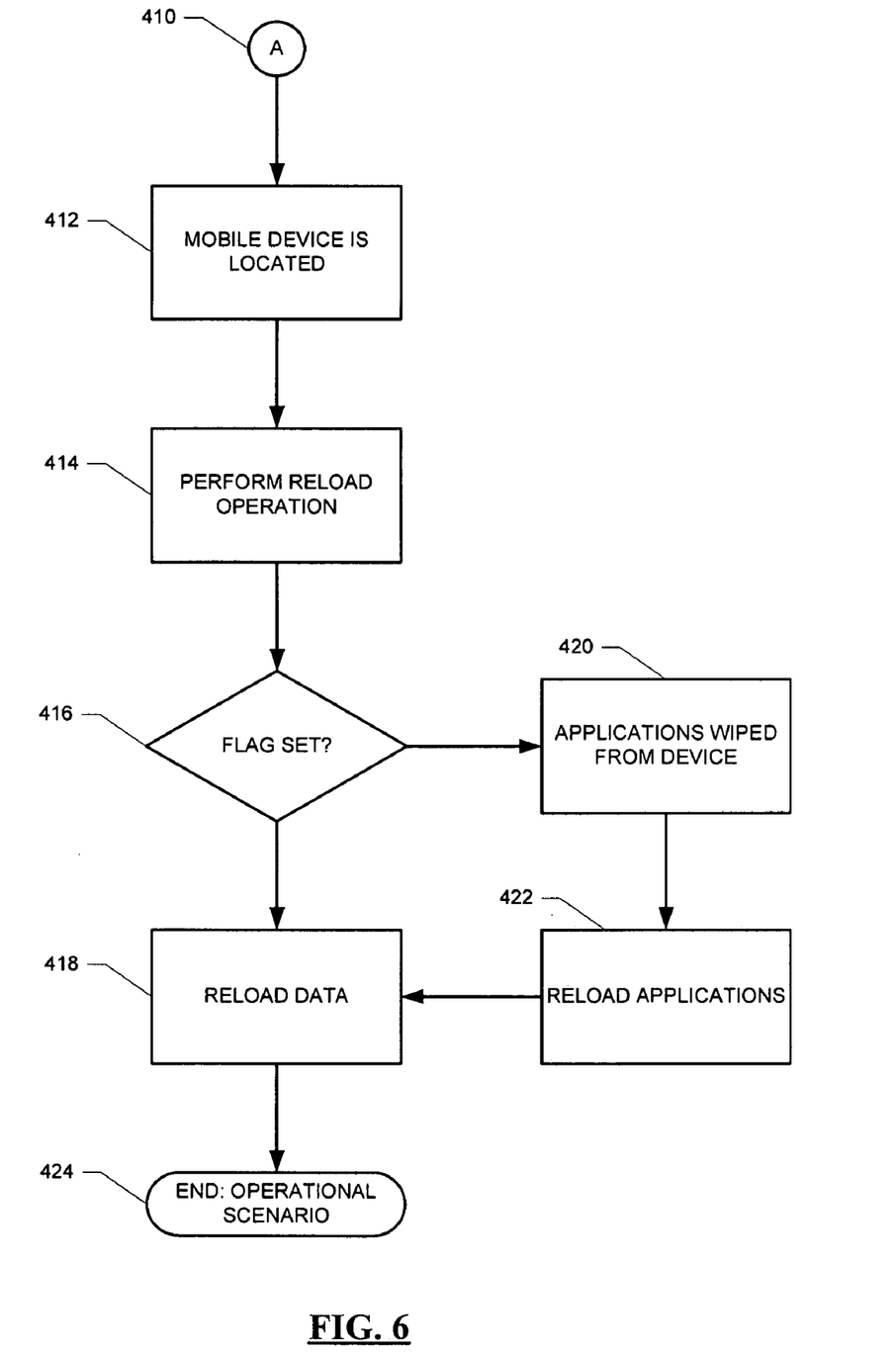

FIGS. 5 and 6 depict an operational scenario 400 to handle reloading operations for a device that was lost. At step 402, the mobile device 100 is determined to be lost or stolen. At step 404, kill pill data is sent to the device 100. The mobile device 100 receives the kill pill data at step 406, and sets an indication 230 (e.g., a flag) in non-volatile store 260. Processing for this operational scenario continues on FIG. 6 as indicated by continuation marker 410.

With reference to FIG. 6, the mobile device 100 is located as indicated by step 412. A reload operation begins at step 414 in order to restore data that may have been removed when the kill pill data was originally sent to the device 100. Decision step 416 examines whether a kill pill flag 230 had been set in the non-volatile memory 260 of the device 100. If a flag 230 had not been set, then data is re-loaded onto the mobile device 100 at step 418, and processing for this operational scenario terminates at end block 424.

However, if a flag 230 had been set as determined by decision step 416, then all or a certain number of applications are removed from the device 100 at step 420. Any Trojan software would also be deleted at step 420. At step 422, the applications that had been removed at step 420 are reloaded onto the device 100. The data is also reloaded at step 418, and processing for this operational scenario terminates at end block 424.

It should be understood that similar to the other processing flows described herein, the steps and the order of the steps in the flowchart described herein may be altered, modified and/or augmented and still achieve the desired outcome. For example, on the first data synchronization after the kill pill is sent, the user could be alerted to the fact that the device had been wiped and then they could be given a set of options on what to do. Such options can include the following: (1) wipe the device; or (2) continue as normal. This allows the user to decide what to do.

As another alternative, an IT department could have a desktop computer IT policy set up (e.g., a "KILL_PILL_AFTERMATH" IT policy). The policy could define the set of actions to take place on the next synchronization after a kill pill is sent. It could include such items as whether to wipe all the applications (or all the non-manufacturer provided applications) and whether to wipe the non-volatile store.

As another example, the device 100 could also, during reloading operations, re-generate content protection keys and any other such information that might have been lost during the wipe.

Figure 7:
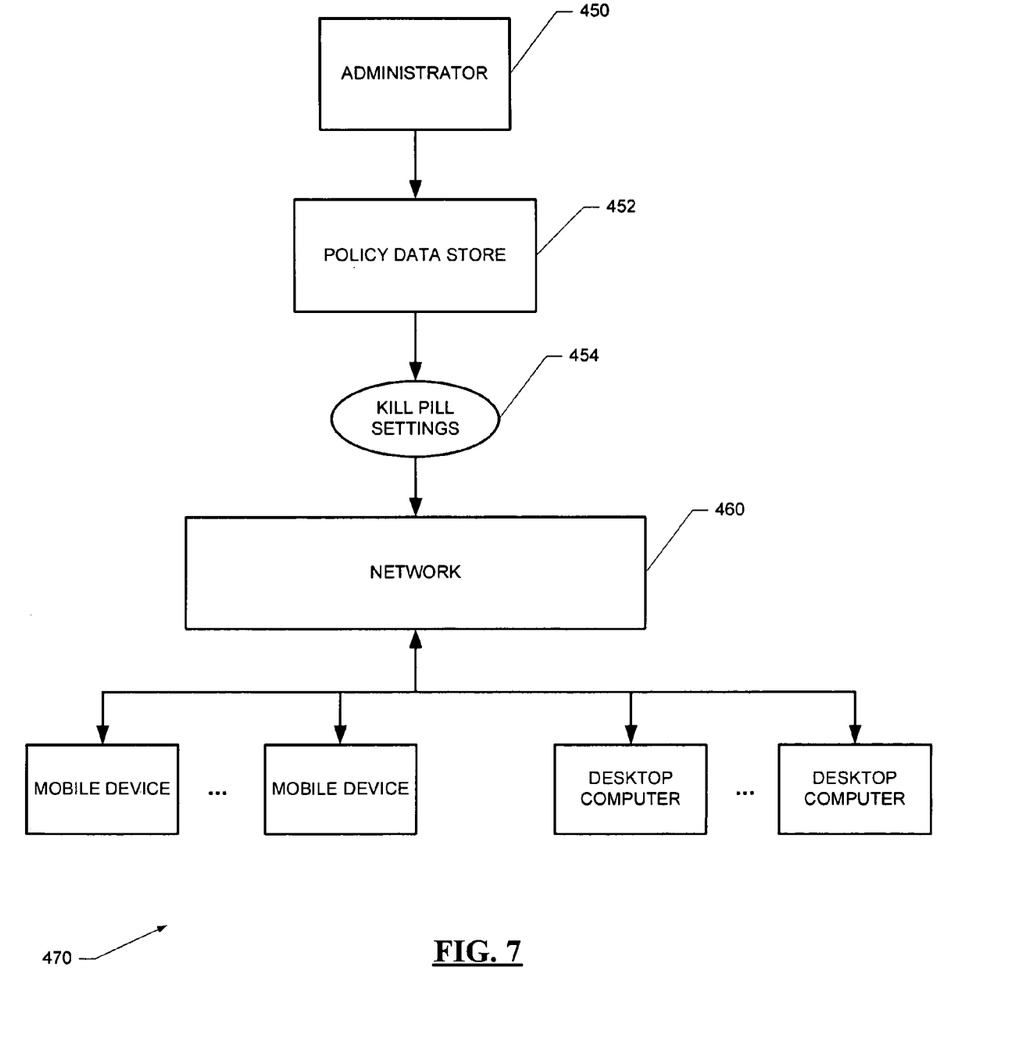
FIG. 7 is a block diagram depicting providing kill pill settings to devices.

FIG. 7 depicts an IT (information technology) administrator 450 (or its agent) providing kill pill criterion or settings 454 to one or more devices 470 (e.g., mobile devices, desktop/laptop computers, etc.). The settings 454 can indicate to a device what operations should be performed when dealing with a kill pill situation and a restoration operation resulting therefrom. The settings 454 can be stored in a data store located on the device for access by a software module that handles kill pill situations as disclosed herein.

The settings 454 may be retrieved from a policy data store 452 and provided to the devices 470 over a network 460 (or other data connection mechanism) in order to update the data stores on the devices 470. The devices 470 can be pre-programmed with the settings and can be updated by the IT administrator 450 or can have the initial settings provided by the IT administrator 450.

This provides, among other things, companies with the capability to customize kill pill settings to suit their needs. Also, an IT administrator 450 can provide the same settings 454 to all devices of the company or organization, thereby ensuring that company devices adhere to a consistent IT policy.

An IT policy can be enforced upon the devices 470 in many ways, such as through the approaches described in the following commonly assigned U.S. patent application which is hereby incorporated by reference: "System And Method Of Owner Control Of Electronic Devices" (Ser. No. 10/732,132 filed on Dec. 10, 2003). This document illustrates how a user of a device can be prevented from altering or erasing owner control information (e.g., kill pill settings 454) specified by an IT administrator 450.

Figure 8:
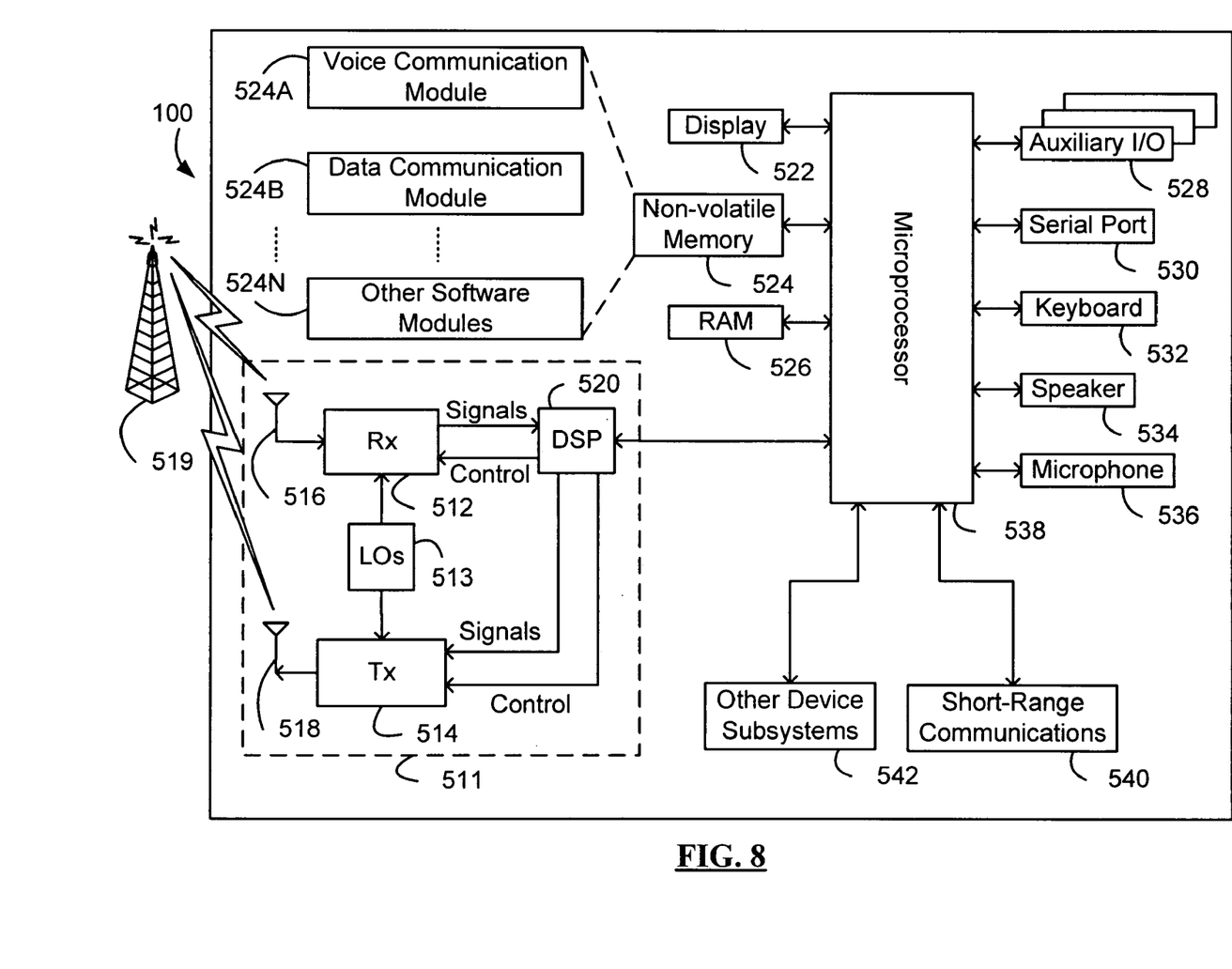
FIG. 8 is a block diagram of an example mobile device.

The systems and methods disclosed herein are presented only by way of example and are not meant to limit the scope of the invention. Other variations of the systems and methods described above will be apparent to those skilled in the art and as such are considered to be within the scope of the invention. For example, the systems and methods disclosed herein may be used with many different computers and devices, such as a wireless mobile communications device shown in FIG. 8. With reference to FIG. 8, the mobile device 100 is a dual-mode mobile device and includes a transceiver 511, a microprocessor 538, a display 522, non-volatile memory 524, random access memory (RAM) 526, one or more auxiliary input/output (I/O) devices 528, a serial port 530, a keyboard 532, a speaker 534, a microphone 536, a short-range wireless communications sub-system 540, and other device sub-systems 542.

The transceiver 511 includes a receiver 512, a transmitter 514, antennas 516 and 518, one or more local oscillators 513, and a digital signal processor (DSP) 520. The antennas 516 and 518 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 8 by the communication tower 519. These voice and data networks may be separate communication networks using separate infrastructure, such as base stations, network controllers, etc., or they may be integrated into a single wireless network.

The transceiver 511 is used to communicate with the network 519, and includes the receiver 512, the transmitter 514, the one or more local oscillators 513 and the DSP 520. The DSP 520 is used to send and receive signals to and from the transceivers 516 and 518, and also provides control information to the receiver 512 and the transmitter 514. If the voice and data communications occur at a single frequency, or closely-spaced sets of frequencies, then a single local oscillator 513 may be used in conjunction with the receiver 512 and the transmitter 514. Alternatively, if different frequencies are utilized for voice communications versus data communications for example, then a plurality of local oscillators 513 can be used to generate a plurality of frequencies corresponding to the voice and data networks 519. Information, which includes both voice and data information, is communicated to and from the transceiver 511 via a link between the DSP 520 and the microprocessor 538.

The detailed design of the transceiver 511, such as frequency band, component selection, power level, etc., will be dependent upon the communication network 519 in which the mobile device 100 is intended to operate. For example, a mobile device 100 intended to operate in a North American market may include a transceiver 511 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 519, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 519, other than any legally required operations, such as '911' emergency calling.

After any required network registration or activation procedures have been completed, the mobile device 100 may the send and receive communication signals, including both voice and data signals, over the networks 519. Signals received by the antenna 516 from the communication network 519 are routed to the receiver 512, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518.

In addition to processing the communication signals, the DSP 520 also provides for transceiver control. For example, the gain levels applied to communication signals in the receiver 512 and the transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 100. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. Other, high-level communication applications, such as a voice communication application 524A, and a data communication application 524B may be stored in the non-volatile memory 524 for execution by the microprocessor 538. For example, the voice communication module 524A may provide a high-level user interface operable to transmit and receive voice calls between the mobile device 100 and a plurality of other voice or dual-mode devices via the network 519. Similarly, the data communication module 524B may provide a high-level user interface operable for sending and receiving data, such as e-mail messages, files, organizer information, short text messages, etc., between the mobile device 100 and a plurality of other data devices via the networks 519.

The microprocessor 538 also interacts with other device subsystems, such as the display 522, the RAM 526, the auxiliary input/output (I/O) subsystems 528, the serial port 530, the keyboard 532, the speaker 534, the microphone 536, the short-range communications subsystem 540 and any other device subsystems generally designated as 542.

Some of the subsystems shown in FIG. 8 perform communication-related functions, whereas other subsystems may provide "resident" or on-device functions. Notably, some subsystems, such as the keyboard 532 and the display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as non-volatile memory 524. The non-volatile memory 524 may be implemented, for example, as a Flash memory component, or as battery backed-up RAM. In addition to the operating system, which controls low-level functions of the mobile device 510, the non-volatile memory 524 includes a plurality of software modules 524A-524N that can be executed by the microprocessor 538 (and/or the DSP 520), including a voice communication module 524A, a data communication module 524B, and a plurality of other operational modules 524N for carrying out a plurality of other functions. These modules are executed by the microprocessor 538 and provide a high-level interface between a user and the mobile device 100. This interface typically includes a graphical component provided through the display 522, and an input/output component provided through the auxiliary I/O 528, keyboard 532, speaker 534, and microphone 536. The operating system, specific device applications or modules, or parts thereof, may be temporarily loaded into a volatile store, such as RAM 526 for faster operation. Moreover, received communication signals may also be temporarily stored to RAM 526, before permanently writing them to a file system located in a persistent store such as the Flash memory 524.

An exemplary application module 524N that may be loaded onto the mobile device 100 is a personal information manager (PIM) application providing PDA functionality, such as calendar events, appointments, and task items. This module 524N may also interact with the voice communication module 524A for managing phone calls, voice mails, etc., and may also interact with the data communication module for managing e-mail communications and other data transmissions. Alternatively, all of the functionality of the voice communication module 524A and the data communication module 524B may be integrated into the PIM module.

The non-volatile memory 524 preferably also provides a file system to facilitate storage of PIM data items on the device. The PIM application preferably includes the ability to send and receive data items, either by itself, or in conjunction with the voice and data communication modules 524A, 524B, via the wireless networks 519. The PIM data items are preferably seamlessly integrated, synchronized and updated, via the wireless networks 519, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 526. Such information may instead be stored in the non-volatile memory 524, for example, when storage intervals are relatively short, such that the information is removed from memory soon after it is stored. However, storage of this information in the RAM 526 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 530 of the mobile device 100 to the serial port of a computer system or device. The serial port 530 may also be used to enable a user to set preferences through an external device or software application, or to download other application modules 524N for installation. This wired download path may be used to load an encryption key onto the device, which is a more secure method than exchanging encryption information via the wireless network 519. Interfaces for other wired download paths may be provided in the mobile device 100, in addition to or instead of the serial port 530. For example, a USB port would provide an interface to a similarly equipped personal computer.

Additional application modules 524N may be loaded onto the mobile device 100 through the networks 519, through an auxiliary I/O subsystem 528, through the serial port 530, through the short-range communications subsystem 540, or through any other suitable subsystem 542, and installed by a user in the non-volatile memory 524 or RAM 526. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 511 and provided to the microprocessor 538, which preferably further processes the received signal in multiple stages as described above, for eventual output to the display 522, or, alternatively, to an auxiliary I/O device 528. A user of mobile device 100 may also compose data items, such as e-mail messages, using the keyboard 532, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 528, which may include a thumbwheel input device, a touchpad, a variety of switches, a rocker input switch, etc. The composed data items input by the user may then be transmitted over the communication networks 519 via the transceiver module 511.

When the mobile device 100 is operating in a voice communication mode, the overall operation of the mobile device is substantially similar to the data mode, except that received signals are preferably be output to the speaker 534 and voice signals for transmission are generated by a microphone 536.

Alternative voice or audio I/O subsystems, such as a voice message recording subsystem, may also be implemented on the mobile device 100. Although voice or audio signal output is preferably accomplished primarily through the speaker 534, the display 522 may also be used to provide an indication of the identity of a calling party, the duration of a voice call, or other voice call related information. For example, the microprocessor 538, in conjunction with the voice communication module and the operating system software, may detect the caller identification information of an incoming voice call and display it on the display 522.

A short-range communications subsystem 540 is also included in the mobile device 100. The subsystem 540 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

The invention claimed is:

1. A method for handling data restoration operations on a mobile device, comprising:
   receiving over a wireless communications network a kill pill command;
   wherein the command causes data on the mobile device to be wiped; and
   storing an indicator in a non-volatile memory of the mobile device that the kill pill command was sent to the mobile device;
   wherein a program wipe configuration is provided to the mobile device that indicates which applications are to be wiped from the mobile device;
   wherein the provided program wipe configuration includes a list that designates specific applications that are to be wiped during a reloading operation and specific applications that are to remain on the mobile device;
   wherein the provided program wipe configuration is based upon an IT department policy which defines actions to take place on a synchronization that occurs after a kill pill command is sent to the mobile device;
   wherein upon updating the mobile device after the kill pill command has wiped the data from the mobile device, using the indicator and the provided program wipe configuration to determine whether an application should be wiped from the mobile device.

2. The method of claim 1, wherein the mobile device was lost, stolen, or missing;
   wherein a malicious program was loaded onto the mobile device;
   wherein the indicator stored in the non-volatile memory of the mobile device is used to determine that the malicious program from the mobile device is to be deleted.

3. The method of claim 1, wherein the kill pill command is sent by an IT (information technology) administrator or an agent thereof in response to the mobile device becoming lost, stolen or missing.

4. The method of claim 1, wherein the kill pill command is a kill pill packet sent to the mobile device in order to cause all of the mobile device's data to be wiped, thereby preventing the data's disclosure.

5. The method of claim 1, wherein the kill pill command is a data wipe command; wherein the indicator is not erased during the wipe of the mobile device's data.

6. The method of claim 1, wherein the provided program wipe configuration specifies that any applications not provided by the mobile device's manufacturer be wiped, while those applications provided by the manufacturer remain on the mobile device.

7. The method of claim 1, wherein the provided program wipe configuration includes settings retrieved from a remotely located policy data store; wherein the mobile device is pre-programmed with the settings which are configured for updating by an IT administrator or the mobile device has the initial settings provided by the IT administrator.

8. The method of claim 1, wherein if a data synchronization is performed after the kill pill command is sent, an alert is provided to the mobile device's user that the mobile device has been wiped.

9. The method of claim 8, wherein the alert to the mobile device's user includes options from which the user can select; wherein the options include wiping the mobile device or continuing as normal.

10. The method of claim 1, wherein during reloading operations, the mobile device re-generates content protection keys.

11. The method of claim 1, wherein the mobile device is a wireless mobile communications device.

12. An apparatus for handling data restoration operations on a mobile device, wherein a kill pill command is sent to the mobile device, said apparatus comprising:
    first instructions configured to execute upon the mobile device and configured to store an indicator in a non-volatile memory of the mobile device that the kill pill command was sent to the mobile device;
    wherein the mobile device wipes data on the mobile device in response to the kill pill command;
    wherein a program wipe configuration is provided to the mobile device that indicates which applications are to be wiped from the mobile device;
    wherein the provided program wipe configuration includes a list that designates specific applications that are to be wiped during a reloading operation and specific applications that are to remain on the mobile device;
    wherein the provided program wipe configuration is based upon an IT department policy which defines actions to take place on a synchronization that occurs after a kill pill command is sent to the mobile device; and second instructions configured to execute on the mobile device;

wherein after the mobile device is recovered, the second instructions are configured to use the indicator and the provided program wipe configuration to determine whether an application should be wiped from the mobile device.

13. A system for handling data restoration operations on a mobile device, comprising:

means for receiving a kill pill command;

wherein the kill pill command causes data on the mobile device to be wiped;

means for storing in a non-volatile memory of the mobile device an indicator that the kill pill command was sent to the mobile device;

wherein a program wipe configuration is provided to the mobile device that indicates which applications are to be wiped from the mobile device;

wherein the provided program wipe configuration includes a list that designates specific applications that are to be wiped during a reloading operation and specific applications that are to remain on the mobile device;

wherein the provided program wipe configuration is based upon an IT department policy which defines actions to take place on a synchronization that occurs after a kill pill command is sent to the mobile device; and means for determining whether an application should be wiped from the mobile device based upon whether the indicator is stored in the non-volatile memory of the mobile device and based upon the provided program wipe configuration.

14. A mobile device for processing data restoration operations, wherein a kill pill command is sent to the mobile device, said mobile device comprising:

first instructions configured to execute upon the mobile device and configured to store an indicator in a non-volatile memory of the mobile device that the kill pill command was sent to the mobile device;

wherein the data is wiped on the mobile device in response to the kill pill command; and second instructions configured to execute on the mobile device;

wherein a program wipe configuration is provided to the mobile device that indicates which applications are to be wiped from the mobile device;

wherein the provided program wipe configuration includes a list that designates specific applications that are to be wiped during a reloading operation and specific applications that are to remain on the mobile device;

wherein the provided program wipe configuration is based upon an IT department policy which defines actions to take place on a synchronization that occurs after a kill pill command is sent to the mobile device;

wherein after the mobile device is recovered, the second instructions are configured to use the indicator and the provided program wipe configuration to determine whether an application should be wiped from the mobile device.

15. Computer-readable storage medium or mediums encoded with instructions that cause a mobile device having a processor to perform a method for handling data restoration operations on the mobile device, said method comprising:

receiving over a wireless communications network a kill pill command;

wherein the command causes data on the mobile device to be wiped; and storing an indicator in a non-volatile memory of the mobile device that the kill pill command was sent to the mobile device;

wherein upon updating the mobile device after the kill pill command has wiped the data from the mobile device, using the indicator to determine whether an application should be wiped from the mobile device;

wherein a program wipe configuration is provided to the mobile device that indicates which applications are to be wiped from the mobile device;

wherein the provided program wipe configuration includes a list that designates specific applications that are to be wiped during a reloading operation and specific applications that are to remain on the mobile device;

wherein the provided program wipe configuration is based upon an IT department policy which defines actions to take place on a synchronization that occurs after a kill pill command is sent to the mobile device;

wherein after the mobile device is recovered, the indicator and the provided program wipe configuration is checked to determine whether an application should be wiped from the mobile device.

16. A method for handling data restoration operations on a mobile device, comprising:

receiving over a wireless communications network a kill pill command;

wherein the command causes data on the mobile device to be wiped; and storing an indicator in a non-volatile memory of the mobile device that the kill pill command was sent to the mobile device;

wherein upon updating the mobile device after the kill pill command has wiped the data from the mobile device, using the indicator to determine whether an application should be wiped from the mobile device;

wherein after the mobile device is recovered and the mobile device begins synchronization to reload the mobile device's data, the indicator is checked;

wherein if the indicator is present in the non-volatile store, then all applications or pre-specified applications are wiped from the mobile devices.

17. The method of claim 16, wherein the mobile device was lost, stolen, or missing;

wherein a malicious program was loaded onto the mobile device;

wherein the indicator stored in the non-volatile memory of the mobile device is used to determine that the malicious program from the mobile device is to be deleted.

18. The method of claim 16, wherein the kill pill command is sent by an IT (information technology) administrator or an agent thereof in response to the mobile device becoming lost, stolen or missing.

19. The method of claim 16, wherein the kill pill command is a kill pill packet sent to the mobile device in order to cause all of the mobile device's data to be wiped, thereby preventing the data's disclosure.

20. The method of claim 16, wherein the kill pill command is a data wipe command; wherein the indicator is not erased during the wipe of the mobile device's data.

21. The method of claim 16, wherein the provided program wipe configuration specifies that any applications not provided by the mobile device's manufacturer be wiped, while those applications provided by the manufacturer remain on the mobile device.

22. The method of claim 16, wherein the provided program wipe configuration includes settings retrieved from a remotely located policy data store; wherein the mobile device is pre-programmed with the settings which are configured for updating by an IT administrator or the mobile device has the initial settings provided by the IT administrator.

23. The method of claim 16, wherein if a data synchronization is performed after the kill pill command is sent, an alert is provided to the mobile device's user that the mobile device has been wiped.

24. The method of claim 23, wherein the alert to the mobile device's user includes options from which the user can select; wherein the options include wiping the mobile device or continuing as normal.

25. The method of claim 16, wherein during reloading operations, the mobile device re-generates content protection keys.

26. The method of claim 16, wherein the mobile device is a wireless mobile communications device.

27. An apparatus for handling data restoration operations on a mobile device that receives over a wireless communications network a kill pill command, wherein the command causes data on the mobile device to be wiped, said apparatus comprising:
- first instructions configured to execute on the mobile device and to store an indicator in a non-volatile memory of the mobile device that the kill pill command was sent to the mobile device; and
- second instructions configured to execute on the mobile device and, upon the mobile device being updated after the kill pill command has wiped the data from the mobile device, to use the indicator to determine whether an application should be wiped from the mobile device;
- wherein after the mobile device is recovered and the mobile device begins synchronization to reload the mobile device's data, the indicator is checked;
- wherein if the indicator is present in the non-volatile store, then all applications or pre-specified applications are wiped from the mobile device.

28. A mobile device for handling data restoration operations, comprising:
- means for receiving over a wireless communications network a kill pill command,
- wherein the command causes data on the mobile device to be wiped;
- first instructions configured to execute on the mobile device and to store an indicator in a non-volatile memory of the mobile device that the kill pill command was sent to the mobile device; and
- second instructions configured to execute on the mobile device and, upon the mobile device being updated after the kill pill command has wiped the data from the mobile device, to use the indicator to determine whether an application should be wiped from the mobile device;
- wherein after the mobile device is recovered and the mobile device begins synchronization to reload the mobile device's data, the indicator is checked;
- wherein if the indicator is present in the non-volatile store, then all applications or pre-specified applications are wiped from the mobile device.

29. A system for handling data restoration operations on a mobile device, comprising:
- means for receiving over a wireless communications network a kill pill command;
- wherein the command causes data on the mobile device to be wiped; and
- means for storing an indicator in a non-volatile memory of the mobile device that the kill pill command was sent to the mobile device;
- wherein upon updating the mobile device after the kill pill command has wiped the data from the mobile device, the indicator is used to determine whether an application should be wiped from the mobile device;
- wherein after the mobile device is recovered and the mobile device begins synchronization to reload the mobile device's data, the indicator is checked;
- wherein if the indicator is present in the non-volatile store, then all applications or pre-specified applications are wiped from the mobile devices.

30. Computer-readable storage medium or mediums encoded with instructions that cause a mobile device having a processor to perform a method for handling data restoration operations on the mobile device, said method comprising:
- receiving over a wireless communications network a kill pill command;
- wherein the command causes data on the mobile device to be wiped; and
- storing an indicator in a non-volatile memory of the mobile device that the kill pill command was sent to the mobile device;
- wherein upon updating the mobile device after the kill pill command has wiped the data from the mobile device, using the indicator to determine whether an application should be wiped from the mobile device;
- wherein after the mobile device is recovered and the mobile device begins synchronization to reload the mobile device's data, the indicator is checked;
- wherein if the indicator is present in the non-volatile store, then all applications or pre-specified applications are wiped from the mobile device.

* * * * *